Figure 1:
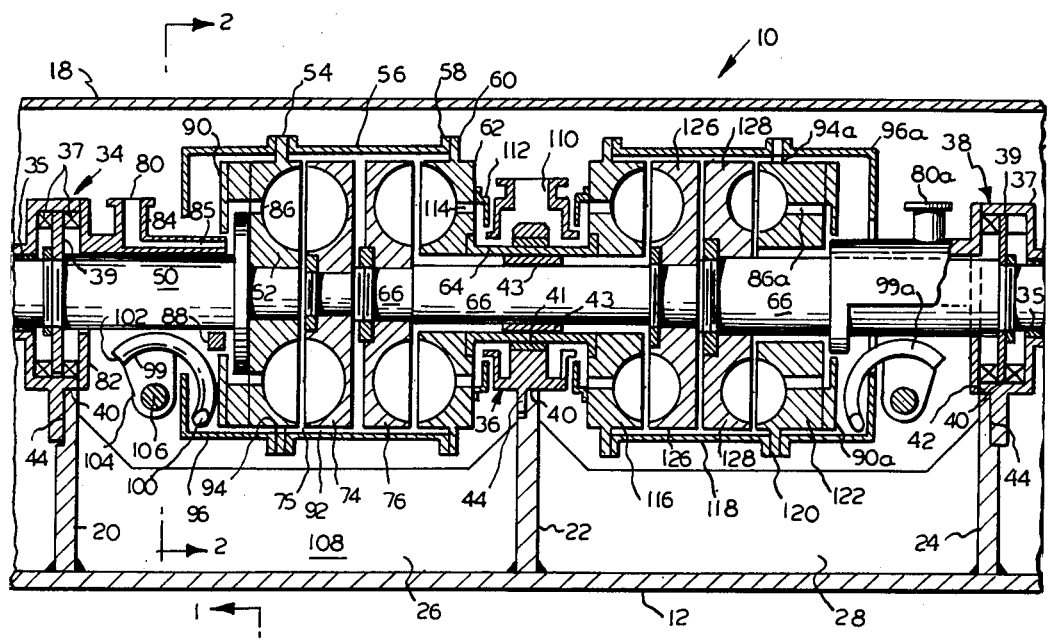

Aug. 17, 1965  E. R. BRAUN  3,200,594
FLUID COUPLING
Filed Oct. 5, 1962

INVENTOR.
EUGENE R. BRAUN
BY
Andrew K. Joneda
his Attorney

10

United States Patent Office 3,200,594
Patented Aug. 17, 1965

3,200,594
FLUID COUPLING
Eugene R. Braun, Royal Oak, Mich., assignor to American Radiator & Standard Sanitary Corporation, New York, N.Y., a corporation of Delaware
Filed Oct. 5, 1962, Ser. No. 228,700
8 Claims. (Cl. 60—54)

This invention relates to fluid couplings and particularly to couplings having a plurality of working circuits for high horsepower transmission, as for example over 30,000 horsepower.

One object of the invention is to provide a multi-circuit fluid coupling having a relatively small radial dimension for use in relatively small clearance spaces.

An additional object is to provide a multi-circuit fluid coupling wherein the circuit members and supporting shafts are adequately supported in precisely aligned bearings to thus prevent shaft misalignment and improper functioning of the circuit members.

A further object is to provide a multi-circuit coupling wherein each of the working circuits is equipped with a variable fill-shaft control mechanism to provide a variable drive from the input to the output shaft. Preferably the fill-control mechanisms are arranged and constructed so that a single mechanism can control each of two working circuits.

A still further object is to provide a multi-circuit coupling having improved arrangements for employing the individual working circuits.

A general object is to provide a coupling which is adapted to transmit high horsepower, as for example over 30,000 horsepower, and which is at the same time susceptible of relatively low cost manufacture.

Other objects of this invention will appear from the following description and appended claims, reference being had to the accompanying drawings forming a part of this specification wherein like reference characters designate corresponding parts in the several views.

Figure 2:
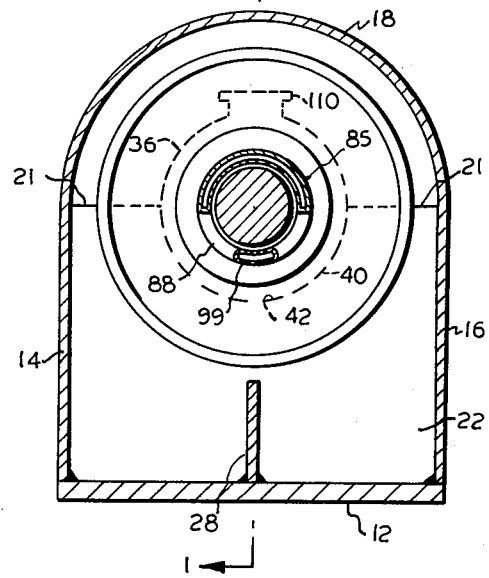

In the drawings:

FIGURE 1 is a longitudinal sectional view taken substantially on line 1—1 in FIG. 2 and illustrating one embodiment of the invention; and FIG. 2 is a sectional view taken substantially on line 2—2 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in greater detail to the drawings, there is shown a fluid coupling 10 which includes a fixed casing having a bottom wall 12, side walls 14 and 16, and a top wall 18. Disposed within the fixed casing are three vertical transverse walls 20, 22 and 24, which are interconnected by longitudinally extending partitions 26 and 28. The entire assembly of casing walls, transverse walls and longitudinal partitions forms a rigid support structure for three spaced bearing assemblies numbered 34, 36 and 38. Assemblies 34 and 38 may be considered as outboard assemblies, and assembly 36 constitutes a center bearing assembly. The illustrated coupling is preferably a high horsepower unit of appreciable length, and it is therefore important that the three bearing assemblies are all precisely aligned with one another, this for the reason that these bearings carry the load of the input and output shafts, impeller and runner shells, and other rotating parts of the coupling. Precision alignment of the bearing assemblies is one feature of my invention.

The illustrated bearing assemblies comprise casings having cylindrical outer surfaces 40 which seat in semi-cylindrical cavities 42 formed in the upper edges 21 of walls 20, 22 and 24. Preferably cavities 42 are formed after walls 20, 22 and 24 have been secured within the fixed casing, as by running boring tools horizontally through walls 20, 22 and 24 to define the fluid coupling axis. After the boring operation, walls 20, 22 and 24 are preferably faced, as at 44, to receive the flanges 46 of the bearing assemblies such that the bearings are aligned axially by surfaces 40 and radially by surfaces 44. Nut-bolt assemblies (not shown) may be provided to retain the bearing assemblies on the supporting walls, although the weight of the bearings and supported elements is preferably carried by cavity surfaces 42 as previously indicated.

Bearing assemblies 34, 36 and 38 may be varied considerably as to construction detail. As shown in the drawings, bearing assembly 34 comprises a sleeve bearing member 35 and two thrust bearings 37. The sleeve bearing encircles a coupling input shaft 50, and the thrust bearings are located on opposite sides of a radial ring element 39 suitably secured to the shaft. Bearing assembly 38 is constructionally similar to bearing assembly 34, the only difference being that it supports the coupling output shaft 66.

Bearing assembly 36 comprises a sleeve bearing element 41 secured within the bearing assembly casing in encircling relation to a sleeve 64 which forms part of the fluid coupling input assembly. An additional sleeve-type bearing member 43 is interposed between input sleeve 64 and a portion of output shaft 66. The arrangement is such that the input assembly is supported by walls 20 and 22, and the output assembly is supported by walls 22 and 24.

In the illustrated fluid coupling input shaft 50 is journaled in bearing assembly 34 and extends therepast to suitable connection with a vaned impeller shell 52, said impeller shell having a peripheral flange 54 which mates with and is secured to the flange of a tubular casing member 56. The right end portion of casing 56 is radially flanged outwardly as at 58 to mate with and be secured to the radial flange 60 of a second vaned impeller shell 62. This impeller shell is secured to the aforementioned sleeve member 64 which is supported by bearing assembly 36 as previously noted.

Output shaft 66 extends a substantial distance leftward past sleeve bearing 43 so as to have a portion thereof arranged to mount the two vaned runner shells 74 and 76. These runner shells are arranged in back-to-back relationship and cooperate with the aforementioned impeller shells 52 and 62 in defining two fluid coupling working circuits.

In high horsepower hydraulic couplings the fluid friction forces are such as to appreciably heat fluid contained within the coupling working circuits. Therefore it is common practice to continuously circulate the working fluid from the working circuits through an external cooler and back into the working circuits after cooling. In the illustrated coupling the working fluid is circulated into the working circuit of members 52 and 74 through a fixed supply or filler conduit 80. The construction of this supply conduit may be varied considerably as to detail, but as shown in the drawing said conduit comprises a generally annular mounting flange 82 for securing the conduit to bearing assembly 34, and an elbow-shaped passage member 84 for directing fluid generally axially toward the left rear face of impeller shell 52. As shown in FIG. 2 passage member 84 defines a passage portion 85 of semi-circular cross section.

The impeller shell is provided with a series of passages 86 which receive fluid from passage portion 85 and direct it into the working circuit. Preferably fluid supply conduit 80 is provided with a ring-like flange 88 which forms a baffle around the outer peripheral surface of shaft 50; a cooperating baffle 90 is carried on impeller shell 52. These baffles tend to contain the fluid being discharged from passage 85 so that the fluid is directed into passages 86 rather than radially outwardly past said passages.

As before mentioned, the fluid in the working circuit is continuously circulated to an external cooler. In the illustrated fluid coupling fluid from the working circuit defined by members 52 and 74 is continuously centrifugally discharged through clearance space 75 into the peripheral space 92 within casing 56. Flange 54 of the impeller shell 52 is provided with a plurality of circumferentially spaced openings 94 which allow the discharged fluid to flow axially leftwardly into a scoop chamber defined by the scoop chamber casing 96.

During operation of the coupling a ring of fluid is constantly maintained in the scoop chamber adjacent the outer periphery thereof. To withdraw fluid from the scoop chamber there is provided a scoop tube which is preferably constructed as shown in copending patent application Serial No. 225,347, now abandoned. Briefly, the scoop tube comprises an arcuate hollow tube 99 having a fluid entrance end 100 and a fluid exit end 102. The tube is carried on an arm 104 which is secured to a rotary transverse control shaft 106. In its illustrated position tube 99 is effective to conduct substantially all of the liquid from the scoop chamber into the sump 108, from whence it can be pumped to an external cooler (not shown). After cooling the fluid is returned to the working circuit of members 52 and 74 through conduit 80.

The amount of liquid in the scoop chamber is proportional to that maintained in the working circuit so that in the illustrated position of the scoop tube the working circuit is substantially drained of fluid, and the coupling is in a substantially declutched condition. Counterclockwise rotation of shaft 106 moves the entrance end 100 of tube 99 radially inwardly toward the axis of shaft 50 to thus permit a thicker fluid ring to be maintained in the scoop chamber and to thus achieve a greater filling of the working circuit. By adjusting and varying the position of shaft 106 it is possible to thus control the drive between input shaft 50 and output shaft 66.

The working circuit defined by members 62 and 76 receives fluid from a conduit 110 which may be constructed as part of the bearing assembly 36. Preferably an annular baffle 112 is carried on impeller 62 to direct the fluid from conduit 110 into passages 114 formed in the impeller shell. As in the case of the previously described working circuit, fluid is discharged through the clearance space between the impeller and runner, and thence into the perpheral clearance space 92 where is proceeds to the aforementioned scoop chamber. Thus, scoop tube 99 and the scoop chamber control the fill in both of the working circuits provided by members 52, 74 and 62, 76. It is old as shown in issued U.S. Patent 2,673,450 to provide a multi-circuit coupling with a scoop chamber and scoop tube for controlling the fill in each of two working circuits. However, in the issued patent the scoop tube is a fixed member and is not effective to vary the fluid fill in the two working circuits. Thus as shown in FIG. 4 of the issued patent the working level is controlled by the ports 57 which are disposed at fixed distances inwardly from the coupling periphery so as to provide a single-level coupling construction. It is believed novel to provide in a multi-circuit coupling a casing scoop-chamber arrangement wherein peripheral passages such as passages 94 are cooperable with an adjustable scoop tube for controlling and varying the fill in each of two working circuits.

Referring again to sleeve 64, there is provided a third vaned impeller shell 116 secured to the sleeve and having a tubular casing 118 which mates with and is secured to the flange 120 of a fourth vaned impeller shell 122. Impeller shell 122 is generally similar to impeller shell 52 and is provided with peripheral flow apertures 94a which feed liquid to a scoop chamber defined by the casing members 96a. Impellers 116 and 122, and casing members 118 and 96a are all secured to one another and to the sleeve 64 so as to rotate as a unit with the input shaft and the previously described impellers and casing members.

Impeller 116 is arranged in juxtaposed relation to a vaned runner shell 126 which is carried on a stepped portion of the output shaft 66. Similarly, impeller 122 is arranged in juxtaposed relation to a vaned runner shell 128 which is carried on another stepped portion of the output shaft 66. Thus, each of the runners 74, 76, 126 and 128 rotate as a unit with the output shaft 66. The two working circuits defined by members 116, 126, 122 and 128 have the liquid level therein controlled by a scoop tube 99a which is constructed similarly to the aforementioned tube 99.

Preferably shaft 66 is stepped in each of its four runner-mounting areas for the purpose of achieving an improved overall result as regards shaft mass, ease of runner assembly operations, and optimum horsepower transmission. In this connection it will be noted that the inner diameter of the runner 74 working chamber is smaller than that of runner 76, which is in turn smaller than that of runner 126, which is in turn smaller than that of runner 128. This graduation of the runner working chamber inner diameters in accordance with shaft diameter stepping is advantageous in that each working chamber can be of maximum size with a given outer diameter dimension.

Liquid is fed to the working circuit defined by members 122 and 128 by a fluid supply conduit 80a which is generally similar to the aforemention conduit 80. This conduit cooperates with an impeller-carried baffle 90a for delivering fluid to impeller passages 86a and thus into the working circuit. The fluid supply for the working circuit of members 116 and 126 is taken through conduit 110 in a manner similar to that employed for the circuit of members 62 and 76.

As previously noted, during operation of the coupling each of the four impellers rotates as a unit with the input shaft 50, and each of the four runners rotates as a unit with the output shaft 66. The arrangement of bearing assemblies adjacent the ends and midpoints of the shafts prevents shaft misalignment which thereby contributes to the attainment of an operable four circuit unit as illustrated. It is believed that this unit is simpler and cheaper than corresponding prior art units, many of which utilize a multiplicity of input and output shafts arranged in offset relation rather than single input and output shafts as shown herein.

The illustrated unit is relatively long in the axial dimension but is relatively small in the radial dimension, thus being adapted for use in clearance areas of small radial distance. From the control standpoint the unit is advantageous in that only two scoop tubes are employed for controlling four working circuits.

One specific embodiment of the invention has been shown and described, but it will be appreciated that the invention may be practiced in such other forms as come within the scope of the appended claims. For example, within its broader aspects the invention could be practiced in fluid couplings having other than four working circuits, as for example by omitting one of the cooperating impeller-runner combinations.

Further modification may be practiced with regard to the relative disposition of the shafts and vaned elements. For example, I can use shaft 66 as the input shaft and shaft 50 as the output shaft, providing some modifications are made in the casings which form the scoop chambers. Essentially such modifications involve connecting casing members 56 and 96 to vaned members 74 and 76 (instead of to members 52 and 62), and connecting casing members 118 and 96a to vaned members 126 and 128 (instead of to members 116 and 122).

I claim:

1. A fluid coupling comprising fixed support structure including first, second and third aligned stationary bearing assemblies; an input shaft journaled in the first bearing assembly; a first vaned impeller carried on said input shaft; an annular casing secured to the first impeller and extending axially therefrom; a second vaned impeller secured to the casing in facing relation to the first impeller; a sleeve member secured to said second impeller and journaled within the second bearing assembly; an output shaft journaled within the third bearing assembly and extending through said sleeve member for rotational support therewithin; a first vaned runner secured to said output shaft in juxtaposed relation to the first impeller; a second vaned runner secured to the output shaft in juxtaposed relation to the second impeller; a third vaned impeller carried by the sleeve member; a second annular casing carried by the third impeller; a fourth vaned impeller secured to the second annular casing in facing relation to the third impeller; a third vaned runner secured to the output shaft in juxtaposed relation to the third impeller; and a fourth vaned runner secured to the output shaft in juxtaposed relation to the fourth impeller.

2. The combination of claim 1 and further comprising a first scoop chamber casing carried by the first impeller and extending axially therefrom in a direction away from the second impeller; and a second scoop chamber casing carried by the fourth impeller and extending therefrom in a direction away from the third impeller.

3. The combination of claim 2 wherein the first impeller is provided with a peripheral flange, one face of which mounts the first annular casing, and the other face of which mounts the first scoop chamber casing; said peripheral flange having flow apertures formed therein, and the outer surfaces of the runners and impellers within the first annular casing being spaced radially inwardly from the casing inner surface so that all fluid in each of two working circuits is caused to flow to the first scoop chamber casing.

4. A fluid coupling comprising first and second fixed outboard bearings; a fixed center bearing; an input shaft journaled in the first outboard bearing; a sleeve journaled in the center bearing; first and second connected facing impellers secured to the input shaft and sleeve and one another in the space between the first outboard bearing and center bearing; an output shaft journaled in the second outboard bearing and extending through the sleeve for rotational support therewithin; first and second back-to-back runners carried on the output shaft in the space between the first two impellers to cooperate therewith in defining first and second working circuits; third and fourth impellers connected to the sleeve and to each other in facing relation in the space between the center bearing and the second outboard bearing; and third and fourth back-to-back runners carried on the output shaft in the space between the third and fourth impellers to cooperate therewith in defining third and fourth working circuits.

5. The combination of claim 4 and further comprising a first filler conduit for the first working circuit located adjacent the first outboard bearing; second and third filler conduits for the second and third circuits located adjacent the center bearing; and a fourth filler conduit for the fourth circuit located adjacent the second outboard bearing.

6. A fluid coupling comprising aligned shafts; means supporting said shafts for rotary movement; a plurality of sets of confronting vaned impeller and runner shells carried by the shafts, the shells on each shaft being of like kind; one of said shafts being stepped along its length to mount one of the vaned shells carried thereby on each of its stepped areas; the vaned shells carried by said one shaft defining working chamber surfaces wherein the outer diameters thereof are the same for all shells but the inner diameters are graduated in accordance with the shaft stepping.

7. A fluid coupling comprising a single input shaft; a plurality of axially aligned vaned impeller shells carried by said input shaft; a single output shaft; a plurality of axially aligned vaned runner shells carried by said output shaft; individual ones of the impeller shells being arranged in confronting relation to individual ones of the runner shells to define a series of separate working chambers; one of said shafts being stepped along its length to mount one of the vaned shells carried thereby on each of its stepped areas; the vaned shells carried by said one shaft defining working chamber surfaces wherein the outer diameters thereof are the same for all shells but the inner diameters thereof are graduated in accordance with the shaft stepping.

8. A fluid coupling comprising first, second and third spaced upstanding walls, the lower portions of which define a sump; outboard bearings carried by the first and third upstanding walls; a center bearing carried by the second upstanding wall; an input shaft journaled in one of the outboard bearings; a first vaned impeller carried on said input shaft; a first annular casing secured to the first impeller and extending axially therefrom toward the center bearing; a second vaned impeller secured to the casing in facing relation to the first impeller; a sleeve member secured to the second impeller and journaled within the center bearing; an output shaft journaled within the other outboard bearing and extending through said sleeve member for rotational support therewithin; a first vaned runner secured to said output shaft in juxtaposed relation to the first impeller; a second vaned runner secured to the output shaft in juxtaposed relation to the second impeller; a third vaned impeller carried by the sleeve member; a second annular casing carried by the third impeller and extending toward the other outboard bearing; a fourth vaned impeller secured to the second annular casing in facing relation to the third impeller; a third vaned runner secured to the output shaft in juxtaposed relation to the third impeller; a fourth vaned runner secured to the output shaft in juxtaposed relation to the fourth impeller; a first scoop chamber casing movable with the first impeller and extending axially therefrom in a direction away from the second impeller; an adjustable scoop tube having a fluid entrance portion extending into the scoop chamber and a fluid exit portion discharging into the sump; a second scoop chamber casing movable with the fourth impeller and extending axially therefrom toward the third bearing; a second adjustable scoop tube having a fluid entrance portion extending into said second scoop chamber and a fluid exit portion discharging into the sump; means for supplying fluid to the circuit defined by the first impeller and runner comprising a fluid supply conduit extending alongside the input shaft to near engagement with the first impeller, and passage means extending through said first impeller located to receive fluid from said first filler conduit; means for admitting fluid to the circuit defined by the second impeller and second runner comprising a filler conduit located adjacent the center bearing, and passage means extending through the second impeller to receive fluid from said second filler conduit; means for supplying fluid to the circuit defined by the third impeller and third runner comprising a third filler conduit located adjacent the center bearing assembly, and passage means extending through said third impeller to receive fluid from the third filler conduit; and means for supplying fluid to the working circuit defined by the fourth impeller and fourth runner comprising a fourth filler conduit extending through the second scoop chamber alongside the output shaft to near engagement with the fourth impeller, and passage means extending through said fourth impeller to receive fluid from said fourth filler conduit.

References Cited by the Examiner

UNITED STATES PATENTS

| 2,161,158 | 6/39 | Gossler | 60—54 |
| 2,179,520 | 11/39 | Popper | 60—54 |
| 2,510,898 | 6/50 | Meloy | 60—54 |
| 2,673,450 | 3/54 | Wolf | 60—54 |
| 2,878,645 | 3/59 | Edmonson | 60—54 |

FOREIGN PATENTS

| 820,660 | 11/51 | Germany. |
| 815,133 | 9/51 | Germany. |

JULIUS E. WEST, *Primary Examiner.*